Oct. 24, 1950        J. A. RYBERG        2,526,973
SHIP SALVAGING APPARATUS
Filed Nov. 10, 1947        2 Sheets-Sheet 1
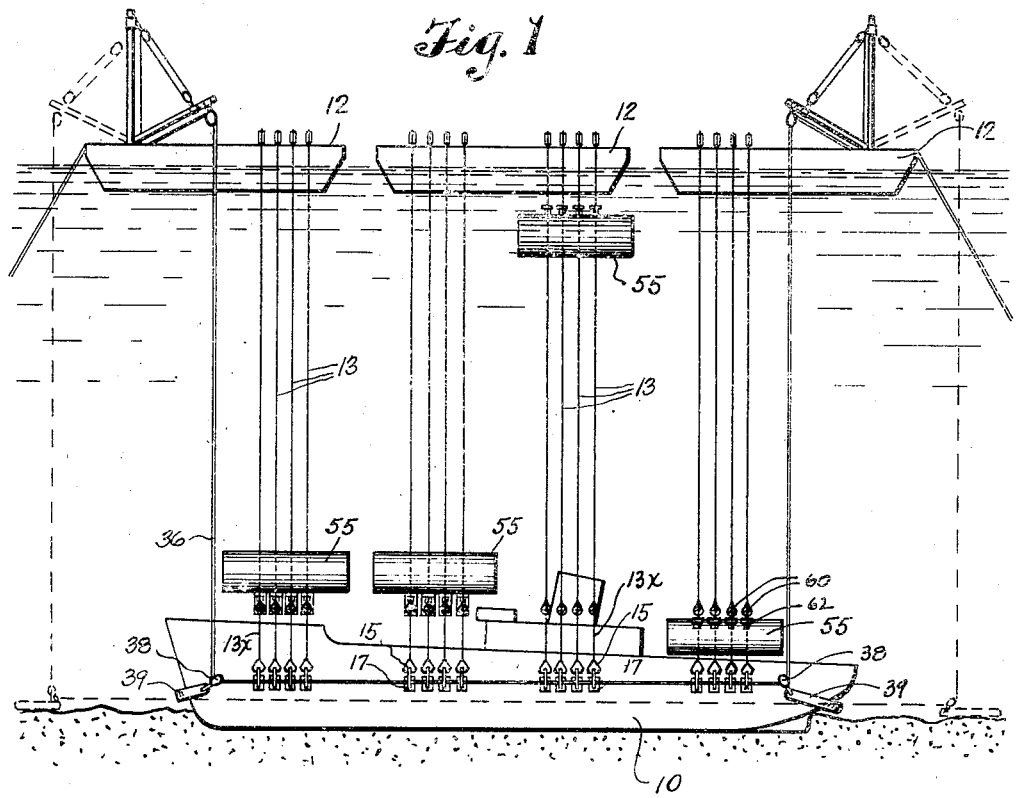
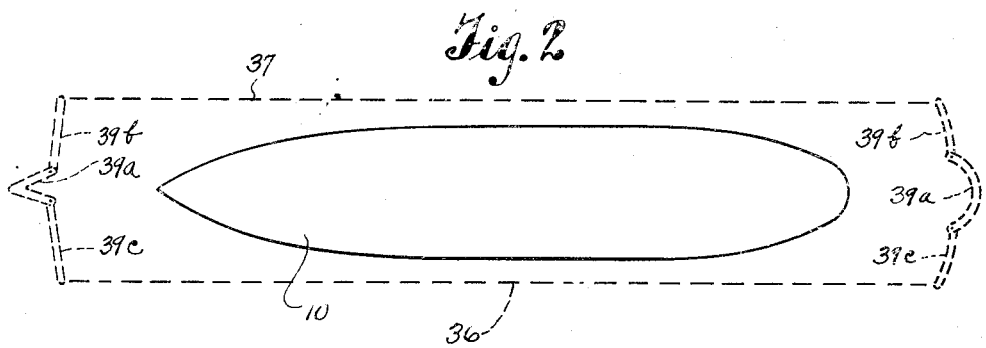
INVENTOR
J. A. RYBERG
BY Cook & Robinson
ATTORNEYS

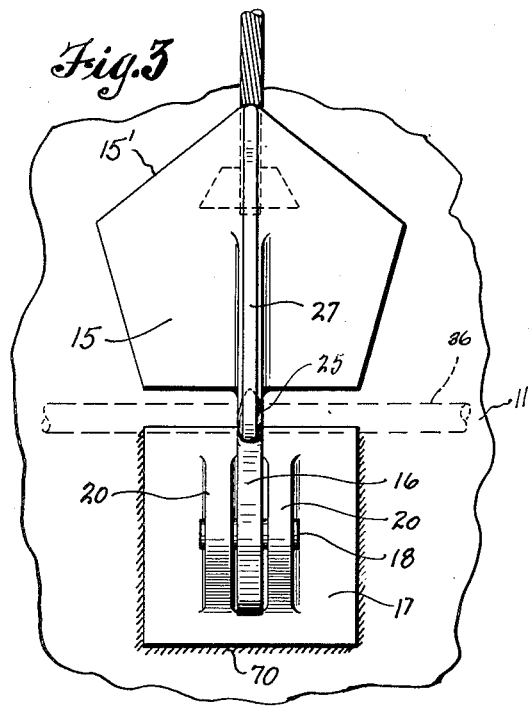
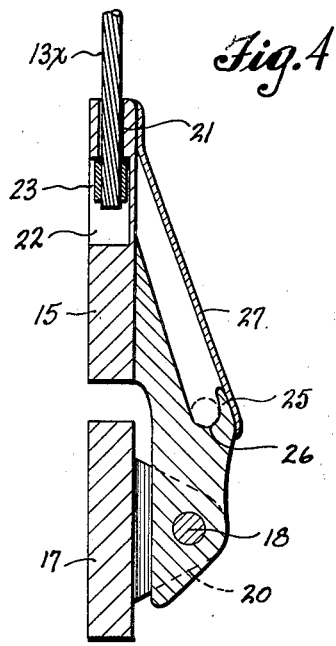
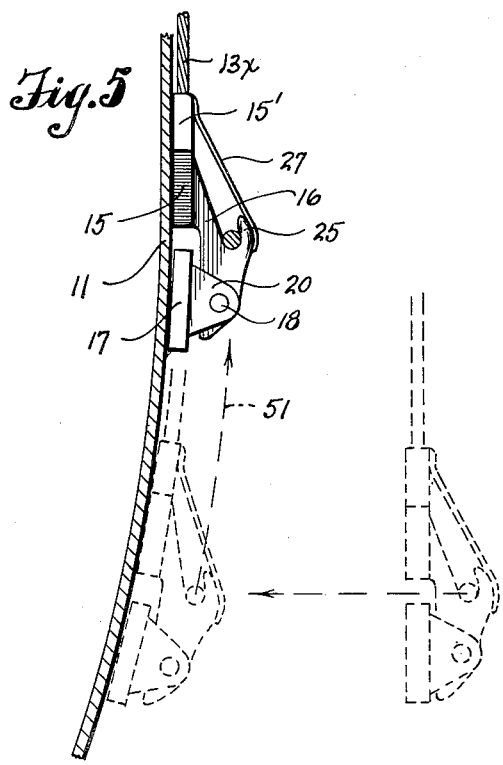
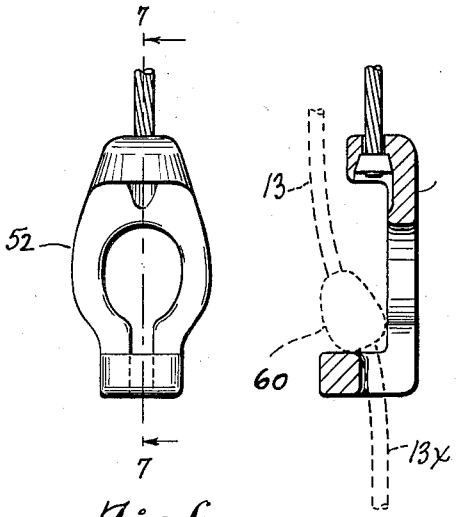

Patented Oct. 24, 1950

2,526,973

UNITED STATES PATENT OFFICE 2,526,973

SHIP SALVAGING APPARATUS

John Albert Ryberg, Forks, Wash.

Application November 10, 1947, Serial No. 784,957

6 Claims. (Cl. 114—51)

This invention relates to ship salvaging means, and it has reference more particularly to apparatus for use in the raising of sunken ships, especially ships having steel hulls and which have sunk in deep water.

It is the principal object of my invention to provide a satisfactory means for and method of raising ships by use of cables; furthermore, with respect to steel hulled ships, to provide a method of securing lifting cables to the hulls so that the ships may be raised by use of pontoons and floated to dry dock or beached for salvaging or repair operations.

Another object of my invention is to provide means for aiding in the welding of cable securing plates to the steel hull of a sunken ship so that the ship may be lifted by means of the cables and pontoons.

For a better understanding of the present invention, it will here be explained that one of the greatest difficulties heretofore experienced in the raising of sunken ships has been to apply and secure lifting cables to the ship. It is usually the case that whatever means there may be on a ship to which lifting cables could be attached are not adequate or properly located. Heretofore attempts have been made to drill holes through the hull or deck of a ship for the attachment of hooks or the like, but this, for various reasons, has not been successful. However, welding below water is now well known and I have found that the welding of steel plates to a steel hull can be accomplished in accordance with the present day practice of underwater welding, but for satisfactory results, the plates must be held tightly against the hull while being welded and furthermore, the surface to which a plate is to be welded must be free of barnacles or other foreign matter.

The present invention, therefore, has to do primarily with the operation of welding plates to a ship's hull for the securing of lifting cables. More specifically, the invention has to do with cleaning the hull at places where plates are to be attached by welding and the provision of bridles whereby the cable attaching plates may be held clamped securely against the ship's hull for the welding operation.

Another object of the invention is to design a cable attaching plate in combination with a scraper whereby a surface portion of the ship's hull to which the plate is to be welded may be cleared of barnacles preparatory to the welding operation.

Still further objects of the invention reside in the provision of and manner of use of a novel form of bridle for the clamping of the cable anchoring plates against a ship's hull for the hull cleaning and the welding operation, and which bridles may be used, when ships of light weight are to be raised, as the lifting means.

Other objects of the invention reside in the details of construction of parts, and in their combination and mode of use as will hereinafter be fully described.

In accomplishing the above mentioned and other objects of the invention, I have provided the improved details of construction, the preferred forms of which are illustrated in the accompanying drawings, wherein—

Fig. 1 is a view, in side elevation, of a sunken ship, and illustrating the present operation of and means for the securing of cables and use of pontoons for lifting the ship.

Fig. 2 is a plan view of a sunken ship, and diagrammatically illustrating the method of and means for placing a plate clamping bridle about the ship.

Fig. 3 is a face view of one of the cable anchoring plates and hull scraping plate as assembled therewith.

Fig. 4 is a central, vertical section of the same.

Fig. 5 is a view illustrating various steps in the application of cable securing plates to the hull of a ship.

Fig. 6 is a view of one of the pontoon attaching hooks.

Fig. 7 is a section on line 7—7 in Fig. 6.

It will be explained that the present operation, for the most part, contemplates the raising of steel ships which are resting on the ocean floor in such position as to make the operation practical, and possible to accomplish by workmen on surface craft operating under direction of workmen in diving bells lowered adjacent the vessel. In brief, the operation comprises first, the locating and anchoring of barges or other suitable surface craft in proper locations above the sunken ship; then the lowering from the barges of the bridle cables and the attaching plates for securement to the ship's hull; then the tightening of the bridles for the purpose of clamping all cable anchor plates against the sides of the hull; then the upward pulling of the plates and scrapers, to cause each scraper to clean a surface portion of the hull for its corresponding plate; then the welding of the plates to the cleaned surface portions of the hull, and finally the ship lifting or raising operation by the sinking of pontoons, securing them to the cables and then exhausting the water from the pontoons by means of air.

Referring more in detail to the drawings—

In Fig. 1, I have designated a sunken ship by reference numeral 10 and in Fig. 5 a portion of the steel hull is designated by numeral 11. Surface craft, such as barges, suitable for this work are designated by reference numeral 12. It is understood that each barge would be equipped with proper devices for the winding in or paying out of cables 13 in a required number whereby the cable anchor plates and bridle are lowered to position.

Secured to the lower end of each cable 13, is an assembly of parts as shown in Figs. 3 and 4, comprising a joined hull scraper and cable anchor plate. The hull scraper member, designated by numeral 15, comprises a flat plate of steel formed with an upwardly pointed or wedge-like upper edge portion 15'. Welded to the plate 15 and depending directly downward therefrom is an arm 16 which, at its lower end, has a flat, rectangular plate of steel 17 pivotally secured thereto by means of a horizontal hinge pin 19 that extends through the lower end portion of the arm and through laterally spaced ears 20—20 that are formed on the outer face of the plate and between which the arm is extended.

The means for the securement of the lower end of the lifting cable 13 to its plate is shown best in Fig. 4 wherein it is illustrated that the lower end of the cable passes downwardly through a vertical hole 21 in the pointed upper end portion of the plate 15 and into a socket 22, and has a ferrule 23 fixed thereto to anchor the cable to the plate.

For a purpose presently explained, each arm 16 is formed at its lower end with an upwardly directed hook portion 25 providing a cable seat 26. A piece of strap iron 27 is secured to the hook end and to the upper end of plate 15, leaving a cable passageway between the strap and arm 16.

For the proper application of the attaching plates to the hull of a ship, I use, in connection with the cables 13, a bridle arrangement of cables which will be understood best by reference to Figs. 1 and 2.

The bridle comprises a pair of cables 36 and 37 which are suspended from barges anchored somewhat beyond the ends of the ship. These cables are shown as being extended lengthwise of the ship at opposite sides thereof, respectively. In accordance with the showing in Fig. 2, each of the cables, as extended along and at the side of the sunken ship, is passed through pulley blocks 38 at opposite ends of cross yokes 39 located beyond the ends of the ship. From the pulley blocks 38 the opposite end portions of each cable pass upwardly to the surface craft and are attached to suitable winding gear. Each of the cross yokes 39 comprises a central member as at 39a (see Fig. 2), designed to engage about the end of the ship, and links, 39b—39c, pivoted to the opposite ends of the member 39a. The pulley blocks 38 are attached to the outer ends of the parts 39b and 39c.

Prior to lowering of the bridle cables, the attaching and scraping plate units are arranged therealong; the bridle cables being passed through the cable passageways provided between the arms 16 and straps 27, and to each plate a suspending cable 13 is attached.

Assuming that the cross yokes 39 and cables 36—37 with attaching plates arranged therealong are lowered to the position relative to the sunken ship as shown in Fig. 2, it will be understood that by winding in on the bridle cables, and by properly manipulating the booms from which these cables are suspended, the yokes may be caused to shift toward and finally to seat against the ends of the ship as in Fig. 1; these operations being directed by divers.

It is further to be explained that by the controlled paying out of the cables 13 with the lowering of the bridle cables, the plates may be suspended in proper relationship to the hull of the sunken ship, for example as indicated at the right hand side in Fig. 5, and then with the tightening of the bridle cables these plates will all be clamped tightly against the ship's hull as shown in the lower left hand view in Fig. 5. After the cables 36 and 37 have been drawn taut, and all plates clamped against the ship's hull, the cables 13 are drawn in, thus causing the scraper plates 15 to be moved upwardly along the hull, as indicated by the dotted arrow 51 in Fig. 5, and their upper end portions to scrape the hull surface free of barnacles and provide flat, clean surfaces against which the plates 17, with their upward travel, may be seated for welding.

After this scraping operation, and while the plates 17 are held tightly against the hull by the tension of the bridle cables, the plates 17 are then welded to the hull, as indicated at 70 in Fig. 3, according to the practice well known for underwater welding. This can be accomplished from diving bells.

With all plates 17 welded to the hull, and with the cables held taut, pontoons 55 are sunk along the cables adjacent the ship and secured to the ship through the mediacy of the short lower end sections of the cables 13 which have been designated at 13x in Fig. 1.

The cable sections 13x, which are secured to the plates 15, are relatively short and are attached to the cables 13 through the mediacy of suitable ferrules or by means of knobs such as indicated at 60. The portions 55 are guided along the cables 13, when lowered, by hooks 62 which are in the form shown in Fig. 6, designed to travel down the cables 13 and to pass over the ferrules 60 or knobs when moving downward, but to lock therewith when the pontoons start to rise along the cables. Thus, assuming that the pontoons have been sunk to proper position, the exhausting of water therefrom by forcing air in will cause the pontoons to lift and effect a holding connection with the cables 13x. In Fig. 1, two secured pontoons have been shown at the left hand side. At the right hand end, a pontoon has been shown as having been sunk to position for passing its attaching hooks 62 below the cable knobs 60.

It is further to be explained that, for raising light weight ships, the bridle may be found sufficient without the use of pontoons.

Having thus described my invention, what I claim as new therein, and desire to secure by Letters Patent, is—

1. A ship salvaging means of the character described comprising, in combination, a plurality of metal plates, cables attached individually to said plates as a means whereby they may be held suspended from surface craft in positions adjacent the sides of the hull of a sunken ship, a cable bridle associated with said plates and adapted to be lowered therewith from surface craft to surround said sunken ship and to be constricted in size and to be drawn tightly against said plates, as suspended, to thereby press them tightly against the said hull for welding thereto.

2. A ship salvaging means of the character described comprising, in combination, a plurality of metal plates, cables attached individually to said plates as a means whereby they may be held suspended from surface craft in positions adjacent the sides of the hull of a sunken ship, a cable bridle associated with said plates and adapted to be lowered therewith from surface craft to surround said sunken ship and to be constricted in size and thereby drawn tightly against said plates, as suspended, to press them into close contact with the said hull for welding thereto; each of said plates having a hull scraping element associated therewith and directly thereabove whereby an upward shifting of said plates by their suspending cables while held in close contact with the hull by the bridle, will cause said scraping elements to clear the surfaces engaged of matter detrimental to the welding of said plates.

3. A salvaging means as recited in claim 2 wherein the bridle comprises cables that extend substantially horizontally along opposite sides of the hull, and wherein the said suspended plates are equipped with cable retaining means through which said horizontal bridle cables extend for their being retained in proper relationship to the plates during lowering and during the operation of clamping the plates against the hull and of scraping the hull surfaces preparatory to welding.

4. A ship salvaging means of the character described comprising, in combination, a plurality of metal plates, cables attached individually thereto and whereby said plates may be held suspended from surface craft in positions adjacent the sides of the hull of a sunken ship, a cable bridle associated with said plates and adapted to be lowered therewith from surface craft to surround said sunken ship and to be constricted and thereby drawn tightly against said plates, as suspended, to press them into close contact with the said hull for welding thereto, and pontoons adapted to be sunk along said cables and hooks attached to the pontoons and adapted for guided travel on said cables as the pontoons are lowered, and means for effecting fixed securement of the hooks to the cables when the pontoons are in sunken positions.

5. A ship salvaging means of the character described comprising, in combination, a plurality of metal plates, cables attached individually to said plates and whereby they may be held suspended from surface craft adjacent the sides of the hull of a sunken ship, a cable bridle associated with said plates and adapted to be lowered therewith from surface craft to surround said sunken ship and to be constricted and drawn tightly against said plates, as suspended, to thereby press the plates into close contact with the said hull for welding thereto; said plate suspending cables having knobs formed thereon adjacent their lower ends, pontoons adapted to be sunk to the vicinity of the sunken ship and equipped with guide hooks designed for travel downwardly on said plate suspending cables and to pass over said knobs, and to effect a holding connection with the knobs when said pontoons move upwardly.

6. A ship salvaging means comprising, in combination, a hull scraper, a plate depending therefrom and adapted to be welded to the hull of a sunken ship, a cable attached to the hull scraper for suspending it and the plate from a surface craft adjacent the side of the hull of a sunken ship, and for pulling said scraper and said plate upwardly therealong, a pair of cables extended between and adapted to be lowered from surface craft in a manner to extend lengthwise of and along opposite sides the said sunken ship, with one of said cables crossing the hull scraper, yokes extending between the paired cables beyond the ends of the sunken ship and adapted to slide along the paired cables and to tighten against the ends of the ship to form a lifting bridle of the said paired cables and yokes when the ends of the paired cables are wound in on the supporting surface craft, thus to cause the scraper to be pressed by the cables crossing it against the ship's hull for the scraping of an area on which the said plate can be welded, and to constrict the bridle to provide an additional lifting means for the sunken ship.

JOHN ALBERT RYBERG.

REFERENCES CITED

The following references are of record in the file of this patent:

UNITED STATES PATENTS

| Number | Name | Date |
|---|---|---|
| 955,763 | Clark | Apr. 19, 1910 |
| 1,308,528 | Olson | July 1, 1919 |
| 1,740,231 | Ellsberg | Dec. 17, 1929 |
| 2,374,134 | Richard | Apr. 17, 1945 |

FOREIGN PATENTS

| Number | Country | Date |
|---|---|---|
| 376,326 | Germany | May 26, 1923 |
| 553,979 | Great Britain | June 15, 1943 |